United States Patent
Danielson

(10) Patent No.: US 10,274,122 B2
(45) Date of Patent: Apr. 30, 2019

(54) PLUMBING ACCESS COVER

(71) Applicant: Adam Danielson, West Jordan, UT (US)

(72) Inventor: Adam Danielson, West Jordan, UT (US)

( * ) Notice: Subject to any disclaimer, the term of this patent is extended or adjusted under 35 U.S.C. 154(b) by 0 days.

(21) Appl. No.: 15/362,136

(22) Filed: Nov. 28, 2016

(65) Prior Publication Data
US 2018/0149299 A1    May 31, 2018

(51) Int. Cl.
*F16L 55/115*    (2006.01)

(52) U.S. Cl.
CPC ....... *F16L 55/115* (2013.01); *Y10T 137/7058* (2015.04)

(58) Field of Classification Search
CPC ..... F16L 55/115; F16L 55/1286; F16K 27/12; Y10T 137/7058
See application file for complete search history.

(56) References Cited

U.S. PATENT DOCUMENTS

| 4,368,550 A * | 1/1983 | Stevens | E04H 4/12 4/492 |
| 5,445,208 A * | 8/1995 | Shaner et al. | B32B 27/30 160/232 |
| 5,561,868 A * | 10/1996 | Campbell | A47K 3/122 4/560.1 |
| 5,939,994 A | 8/1999 | Meier | |
| 6,578,208 B1 * | 6/2003 | Lytle | E04H 4/1272 4/507 |
| 8,453,666 B2 * | 6/2013 | Coscarella | E03B 7/003 137/15.01 |
| 9,384,638 B2 | 7/2016 | Yamano | |
| 9,476,214 B2 * | 10/2016 | Parks et al. | E04H 4/14 |
| 2006/0278275 A1 * | 12/2006 | Stewart et al. | F16K 27/12 137/382 |

OTHER PUBLICATIONS

Adam Danielson; Sewage Cleanout Cover; U.S. Appl. No. 14/590,575—Initial Filing; Sep. 17, 2015.

* cited by examiner

*Primary Examiner* — Kevin Lee
(74) *Attorney, Agent, or Firm* — Fabian VanCott; Eric D. Nielson

(57) ABSTRACT

A plumbing access cover, including: a circular base with a circular access opening and a first set of threads around the perimeter of the base; a faceplate comprising a second set of threads to interlock with the threads on the base, wherein the circular access opening is 3 to 7 inches in diameter.

15 Claims, 5 Drawing Sheets

PLUMBING ACCESS COVER

BACKGROUND

Plumbing systems, including sewage systems, may include designated locations to facilitate inspection or clean out. These locations include sealed openings to the pipes of the plumbing system. In other examples, access locations may be added after the plumbing system is in place.

BRIEF DESCRIPTION OF THE DRAWINGS

The accompanying drawings illustrate various examples of the principles described herein and are a part of the specification. The illustrated examples are merely illustrative and do not limit the scope of the claims. Like numerals denote like but not necessarily identical elements.

DETAILED DESCRIPTION

Plumbing systems may include access points. Access points are areas where the pipes can be accessed for maintenance and/or repair purposes. Access points may include valves or ether access into the pipes. This may render such locations vulnerable to leakage.

In use of covers attached to the pipe using a screw is known. These covers have some drawbacks. For example, the screw is located in the center of the cover making them inflexible if the hole in the wall is not centered ever the pipe. The screw may be exposed to the contents of the pipe and vulnerable to corrosion. The screw may compromise the integrity of the pipe.

Another approach is to cover the access with wall material. This has the advantage of minimizing the aesthetic impact of the access point. However, in the event that maintenance or an emergency repair is needed, the process of locating the access point in the plumbing system can be damaging and costly.

Accordingly, the present disclosure discusses, among other examples, a plumbing access cover, including: a circular base with a circular access opening and a first set of threads around the perimeter of the base; a faceplate comprising a second set of threads to interlock with the threads on the base, wherein the circular access opening is 3 to 7 inches in diameter.

The present disclosure also covers a plumbing access cover, including: a base, the base comprising an opening with a diameter of 3 to 7" passing through the base, wherein the inner surface of the opening is threaded; a faceplate comprising a stem extending from a back of the faceplate, the faceplate, the stem treaded to interlock with the inner surface of the opening and the faceplate sized to cover the base.

The present specification also discusses a method of using a plumbing access cover, including: attaching a faceplate to a base, the base secured to a wall over an opening, such that the attached faceplate seals the opening with non-combustible material.

Figure 1:
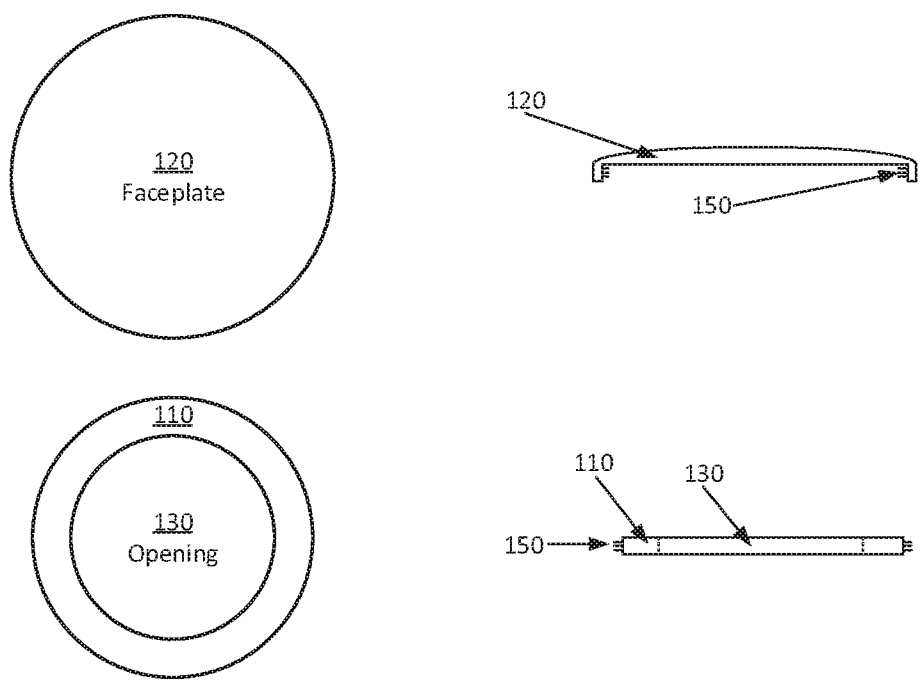
FIG. 1 shows an example of a plumbing access cover according to one example consistent with this disclosure.

Turning now to the figures, FIG. 1 shows an example of a plumbing access cover according to one example consistent with this disclosure. The cover includes to principle-parts: a base (110) and a faceplate (120). The base is secured to a wall. The base (110) includes an opening (130). The opening is positioned over an opening in the wall. The opening (130) allows access to a pipe located behind the wall. The opening (130) may allow access to a sewage clean out on the pipe. The opening (130) may allow, access into the interior of the pipe.

The base (110) allows attachment of the faceplate (120) onto the base (110). When the faceplate (120) is attached, the opening (130) with its access into the wall and to the pipe is blocked. The opening (130) in the base (110) may be between 3 and 7 inches in diameter. In one example, the opening is approximately four inches in-diameter and works well for accessing a two-inch diameter pipe. In another example, the opening is approximately six inches in diameter and works well for accessing a three-inch diameter pipe. Larger or smaller covers may be implemented depending on the size of the access needed to the components behind the wall and the acceptable aesthetic impact of the cover.

The base (110) may include a seal or a layer of adhesive on the wall facing surface. In one example, this is an adhesive layer with a peel away cover. The cover is removed and the adhesive applied agent the wall, allowing quick mounting of the base (110). The seal or adhesive layer may prevent fluid from penetrating behind the base into the opening of the wall. For instance, if the access is mounted in a high humidity area like a bathroom, this may prevent mold or similar issues from accumulating in the wall. The adhesive may be ridged or grooved to aid in sealing off the perimeter of the base (110). This allows the adhesive to flow to fill gaps or discontinuities on the wall, for example, the grout lines between tiles. The adhesive layer may be supplemented by additional anchoring mechanisms. For example, screws may be passed through the base (110) into the wall to secure the base (110) in place. In another example, the base (110) includes a clamp and/or anchor to secure the base (110) to the wall.

The faceplate (120) covers the base and seals the opening (130). In one example, the faceplate (120) attached to the base (110) using treads (150) around the periphery of the base (110). These interact with threads (150) located on the inside of the faceplate (120). This approach allows the faceplate (120) to be snugged against the wall, avoiding a gap that may be unattractive. The threads (150) may have a low pitch similar to that found on a screw or bolt. This helps provide a snug fit by the faceplate (120) against the wall. In another example, the threads (150) may have a relatively high pitch, for example, approximately 45 degrees, 30 degrees, or 15 degrees. This may allow the faceplate (120) to be secured or removed quickly. In one example, the threaded surface of the base (110) and the faceplate (120) are sloped relative to the wall (or back of the base (110). This may speed attachment and removal of the faceplate while increasing the contact area between the faceplate (120) and the base (110). In another example, the threaded surfaces are orthogonal to the wall and/or back of the base (110).

The faceplate (120) may be round. The faceplate (120) may have another shape, for example, diamond, oval, etc. The use of a non-round shape may make turning the faceplate (120) onto the base (110) easier, for examples if attachment uses the interlocking threads described above.

The faceplate (120) may include features to facilitate turning, for example, bumps, indentations, a knob, etc. The faceplate (120) may include an indentation or opening to receive a tool. For example, the faceplate (120) may accommodate, e.g., a slotted screwdriver, a Phillips head screw driver, an Allen wrench, and/or similar tools. The tool may aid in securing the device in place, removing the device, and/or unlocking the device. In one example, the faceplate (120) uses a tool to remove the faceplate (120) from the base (110). This may help keep children or unauthorized persons from accessing the area behind the wall. In one example, inserting the tool into the receptacle on the faceplate disengages a latch or ratchet that otherwise impedes removal. The tool could be a conventional tool as described above. The tool could be a custom tool or a non-standard tool to make access more difficult for unauthorized persons.

The faceplate (120) may have an outer surface prepared to receive paint. In one example, the faceplate (120) includes texturing to facilitate painting or provide a desired finish. The faceplate (120) may be primed or otherwise modified to facilitate painting. In other example, the faceplate (120) is available in a number of common colors and finishes, for example, white, off-white, taupe, beige, etc. In another example, the faceplate (120) may include a symbol or other indicator of the nature of the access point. For example, the faceplate (120) may include a toilet icon or a water droplet. The faceplate (120) may include decorative material, for example, the faceplate (120) may be patterned and/or metalized.

Figure 2:
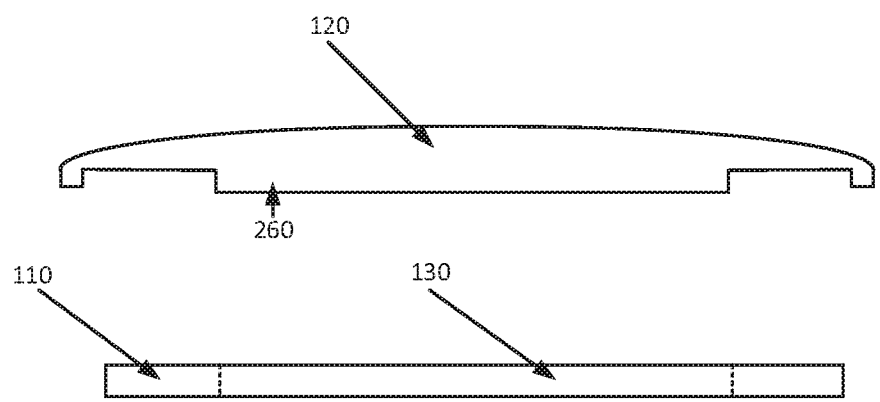
FIG. 2 shows another example of a cover consistent with the present disclosure.

FIG. 2 shows another example of a cover consistent with the present disclosure. In FIG. 2, the base (110) includes an opening (130). In contrast, the attachment of the faceplate (120) uses an interior edge of the opening (130). For example, the opening (130) may include threads (150) which may be paired with threads (150) on the faceplate (120). As shown in FIG. 2, this base (110) may be essentially flat and the stem (260) on the faceplate (120) may be roughly the thickness of the base (110). In another example, the stem (260) may be longer than the thickness of the faceplate (120) and/or the base (110) may extend the threaded tube into the wall. This approach may allow a longer attachment area between the faceplate (120) and the base (110).

The use of threads (150) on the opening surface may also reduce the protrusion of the faceplate (120) from the wall while still assuring acceptable contact between the base (110) and the faceplate (120). The depth of the opening may be extended behind the base (110) into the hole in the wall with a tube or similar structure as shown. The tube may be solid or may include openings to reduce material costs and increase visibility/light in the work area behind the base (110).

In one example, the base (110) may include a tapered edge around the outer perimeter. The tapered edge may interact with and/or support the faceplate (120) as the faceplate (120) contacts the wall, reducing the susceptibility to damage. The base (110) may include a gasket or flexible ring near the edge that seals the area between the faceplate (120) and the base (110) when the faceplate (120) is in place.

Other methods may be used to attach the faceplate (120) to the base (110) using the inner surface of the opening (130). For example, the inner surface may include lock/key type groves and indentations allowing the faceplate (120) to slide onto the base (110) and then rotate to lock in position. In another example, the faceplate (120) just slides into the opening and is held in place by friction. The faceplate (120) may include surface modification, for example, texturing to modify the friction between the stem (260) and the opening. Similarly, latches, ratchets, clasps, etc. may be used to secure the faceplate (120) over the base (110) while still allowing the faceplate (120) to be removed when access to the pipe in the wall behind the base is needed. The opening (130) may include a tool rest or other features to facilitate operations on the pipe behind the base (110).

The base (110) and the faceplate (120) may be formed as a single component, for example, with a hinge molded between them. The base (110) and the faceplate (120) may be formed from a common material. In other examples, the base (110) and the faceplate (120) are selected from different materials. Some suitable materials include: polymers, such as polyvinyl chloride (PVC), acrylonitrile butadiene styrene (ABS or ABS rubber), polycarbonate (PC), polyurethane (PU), polyester, polyamide (Nylon), and silicone rubber; metals, such as aluminum, iron (including cast iron), steel, brass, bronze, etc.; composites, such as fiberglass or reinforced polymers; ceramics (e.g. alumina), etc. The base may include a softer material overmolding a more rigid frame, for example, a silicone rubber molded over a PVC frame.

In one example, the base (110) is formed from a material with a lower durometer than the faceplate (120). For example, the base may be formed from a rubber with an incorporated gasket and the faceplate may be formed from a stiffer material such as polyamide, polystyrene, or aluminum. The compliance of the base allows to formation of a tight seal between the base (110) and the faceplate (120).

The use of different materials for the faceplate (120) and base (110) allows optimization of the base for adhesion and impermeability while facilitating painting and aesthetics of the faceplate (120). For example, if the base (110) uses a silicone adhesive, the use of a silicone rubber base (110) allows chemical bonding to the base (in contrast, for example, to some other polymers). As paint often adheres poorly to silicone, the use of a different material for the faceplate (120) may allow a user to paint the faceplate (120) to match the color of the wall.

The material selection also allows the cover to isolate the interior of the wall. This may allow the opening in the wall covered with the faceplate (120) to comply with rating requirements for fire containment or isolation. The use of silicone or similar non-combustible materials as the base (110) and faceplate (120) can form a complete seal, allowing the wall to retain a desired fire rating despite having an access available to pipes located behind the wall. In one example, the cover includes a fire pad located behind the faceplate (120). The fire pad may be located between the base (110) and the faceplate (120). The fire pad may be located behind the base (110).

Figure 3:
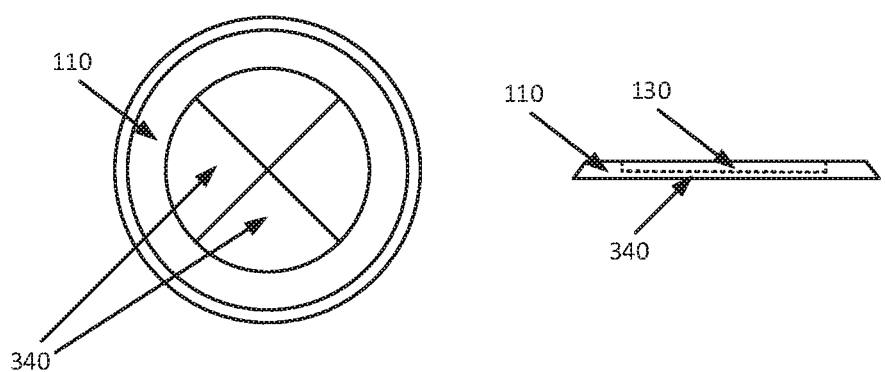
FIG. 3 shows an example of an access cover according to the present disclosure

FIG. 3 shows another example of an access cover according to the present disclosure. The base (110) is visible with an opening (130). In this example, the base (110) includes a membrane in the form of flaps (340) over the opening (130). The membrane forms a seal when initially installed but may be removed with a cutting tool. Once the job is done, the faceplate (120) may be placed over the base, sealing the opening (130). In one example, the membrane comprises a number of flaps (340), for example, four taps (340). The flaps (340) may be pushed aside to access the pipe behind the cover but restore to their position in the opening (130) after accessing is finished. In one example the flaps (340) are displaced using a pipe segment pressed through the opening, the pipe segment holds the flaps (340) open and keeps them out of the way while work is being performed. When work is complete, the pipe segment is retracted and the flaps (340) return to their blocking positions.

The flaps (340) may overlap. The flaps (340) may be formed by cutting the membrane rather than removing the membrane. The flaps (340) may reduce communication through the opening (130). The membrane may completely seal the opening (130). The membrane may partially seal the opening (130).

In one example, the flaps (340) include features to allow them to interlock, for example, interdigitation, or snaps. In one example, the features are located on the edges of the flaps (340). The features may be located on the body of the flaps (340). The flaps (340) may overlap. In one example the flaps (340) are wedge shaped. In another example, the flaps (340) are petal shaped. The flaps (340) may be independent or connected. The flaps (340) may be at different thicknesses through the opening (130).

Figure 4:
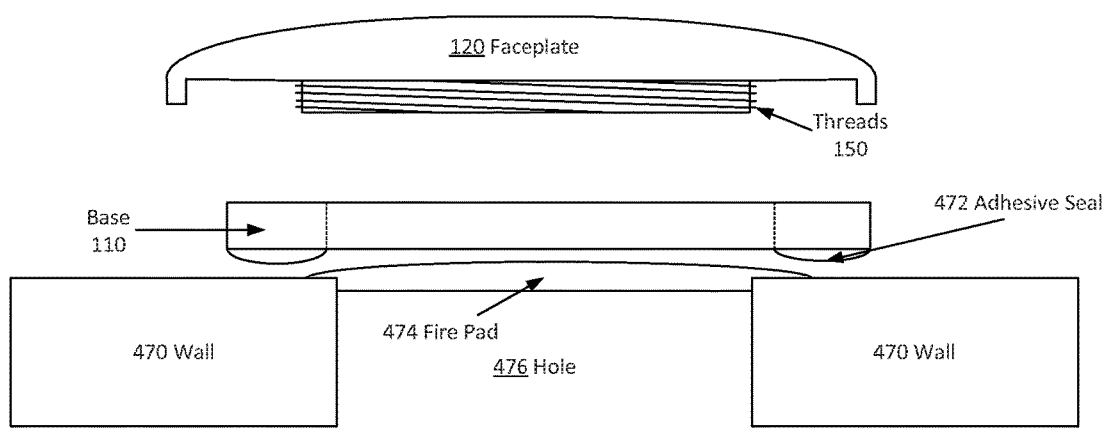
FIG. 4 shows an example of a cover being applied to a wall consistent with the present disclosure.

FIG. 4 shows an example of a cover being applied to a wall (470) consistent with the present disclosure. The wall (470) contains a hole (476). The base (110) is applied to the wall with an adhesive seal (472). A fire pad (474) contacts a back surface of the cover. The faceplate (120) is then secured to the base (110) by the threads (150).

Figure 5:
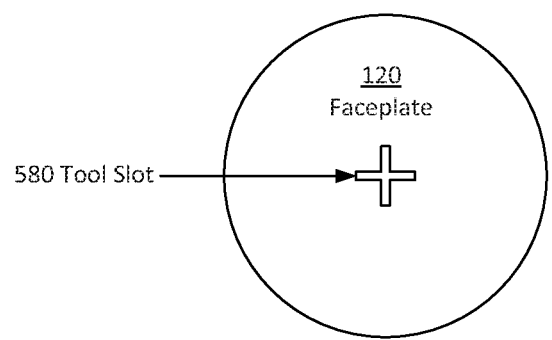
FIG. 5 shows an example of a cover consistent with the present disclosure.

FIG. 5 shows an example of a cover consistent with the present disclosure. The cover includes a tool slot (580) on an outward surface of the faceplate (120).

It will be appreciated that, within the principles described by this specification, a vast number of variations exist. If should also be appreciated that the examples described are only examples, and are not intended to limit the scope, applicability, or construction of the claims in any way.

What is claimed is:

1. A plumbing access cover, comprising:
    a circular base with a circular access opening and a first set of threads around an outside perimeter of the base, wherein the base comprises a plurality of flexible flaps in the circular access opening; and
    a faceplate comprising a second set of threads to interlock with the threads on the base, the faceplate sealing the circular access opening,
    wherein the circular access opening is 3 to 7 inches in diameter.

2. The cover of claim 1, wherein the base and the faceplate comprise non-combustible materials such that when the faceplate is secured to the base and the base covers an opening in a wall, a fire rating of the wall is not compromised by the covered opening in the wall.

3. The cover of claim 1, further comprising a layer of adhesive on a bottom of the base.

4. The cover of claim 3, wherein the layer of adhesive comprises a peel away cover to expose the adhesive prior to adhering the base to a surface with the adhesive.

5. The cover of claim 4, wherein the adhesive is a silicone.

6. The cover of claim 3, wherein the adhesive is an epoxy.

7. The cover of claim 1, wherein the faceplate further comprises an indentation to receive a tool and the tool facilitates rotation of the faceplate on the base.

8. The cover of claim 1, wherein the faceplate further comprises an opening to receive a tool, and the tool facilitates rotation of the faceplate on the base.

9. The cover of claim 2, wherein the base comprises a silicone rubber.

10. The cover of claim 1, wherein the base further comprises a membrane completely sealing the circular access opening.

11. The cover of claim 2, wherein the faceplate completely covers the base when the faceplate is installed on the base and the threads are on a tapered side of the base to speed attachment of the faceplate to the base.

12. The cover of claim 1, wherein the cover further comprises a firepad attached to a back surface of the cover.

13. A method of using a plumbing access cover, comprising:
    attaching a faceplate to a base, wherein the faceplate comprises a fire pad on a back surface of the faceplate, the base secured to a wall over an opening, such that the attached faceplate seals the opening with non-combustible material to maintain a fire rating of the wall,
    wherein when the faceplate is attached, the faceplate covers the base and the fire pad cover the opening in the base.

14. The method of claim 13, wherein the base is secured to the wall with an adhesive.

15. A plumbing access cover, comprising:
    a circular base with a circular access opening and a first set of threads around an outside perimeter of the base; and
    a faceplate comprising a second set of threads to interlock with the threads on the base, the faceplate sealing the circular access opening,
    wherein the base and the faceplate comprise non-combustible materials such that when the faceplate is secured to the base and the base covers an opening in a wall, a fire rating of the wall is not compromised by the covered opening in the wall, the faceplate completely covers the base when the faceplate is installed on the base, the threads are on a tapered side of the base to speed attachment of the faceplate to the base, and wherein the circular access opening is 3 to 7 inches in diameter.

* * * * *